(12) United States Patent
Youngers

(10) Patent No.: US 7,055,743 B2
(45) Date of Patent: Jun. 6, 2006

(54) END-OF-TRAVEL FOCUS SHIFT IN AN OPTICAL IMAGE SCANNER

(75) Inventor: Kevin J. Youngers, Greeley, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 10/370,671

(22) Filed: Feb. 20, 2003

(65) Prior Publication Data

US 2004/0164153 A1 Aug. 26, 2004

(51) Int. Cl.
*G06K 7/10* (2006.01)
*G06K 7/14* (2006.01)
*H04N 1/04* (2006.01)

(52) U.S. Cl. ............ 235/454; 358/483; 358/474; 358/497; 250/235

(58) Field of Classification Search ........... 358/474, 358/497, 505, 475, 494, 486, 471, 483; 235/454; 250/234, 235, 208.1; 399/211; 382/312, 382/318, 319
See application file for complete search history.

(56) References Cited

U.S. PATENT DOCUMENTS

| | | | |
|---|---|---|---|
| 4,059,756 A | | 11/1977 | Wilwerding |
| 4,225,215 A | | 9/1980 | Cojan |
| 4,557,593 A | * | 12/1985 | Iwanade ................ 355/57 |
| 4,707,615 A | * | 11/1987 | Hosaka ................. 358/513 |
| 4,901,164 A | * | 2/1990 | Kurosawa ............. 358/473 |
| 4,980,720 A | * | 12/1990 | Siegel .................. 399/52 |
| 5,038,027 A | * | 8/1991 | Ioka ................. 250/208.1 |
| 5,210,398 A | | 5/1993 | Metlitsky |
| 5,276,530 A | * | 1/1994 | Siegel .................. 358/406 |
| 5,278,677 A | * | 1/1994 | Lee et al. ............. 358/498 |
| 5,362,958 A | * | 11/1994 | Ando ................. 250/208.1 |
| 5,450,157 A | | 9/1995 | Rees |
| 5,453,784 A | | 9/1995 | Krishnan et al. |
| 5,489,993 A | * | 2/1996 | Ito et al. ............... 358/482 |
| 5,610,731 A | * | 3/1997 | Itoh .................... 358/496 |
| 5,616,909 A | | 4/1997 | Arackellian |
| 5,736,738 A | | 4/1998 | Movaghar et al. |
| 5,742,326 A | | 4/1998 | Matsui et al. |
| 5,756,981 A | | 5/1998 | Roustaei et al. |
| 5,764,382 A | * | 6/1998 | Shiraishi .............. 358/496 |
| 5,786,582 A | | 7/1998 | Roustaei et al. |
| 5,812,172 A | * | 9/1998 | Yamada ................ 347/171 |
| 5,878,152 A | | 3/1999 | Sussman |
| 5,898,171 A | | 4/1999 | McConica et al. |
| 5,998,786 A | | 12/1999 | Movaghar et al. |
| 6,037,968 A | | 3/2000 | Emge et al. |
| 6,123,261 A | | 9/2000 | Roustaei |
| 6,169,622 B1 | * | 1/2001 | Tsai et al. ............. 359/210 |

(Continued)

FOREIGN PATENT DOCUMENTS

EP  0027373  *  4/1981

(Continued)

OTHER PUBLICATIONS

UK Search Report dated Jul. 26, 2004 (3 pgs.).

*Primary Examiner*—Daniel Walsh

(57) ABSTRACT

End-of-travel focus shift in an optical image scanner is provided. One embodiment comprises a method for optically scanning. Briefly described, one such method comprises translating an optical head to a first end-of-travel position and adjusting the distance between the optical head and a platen by engaging the optical head with a first stop member disposed at the first end-of-travel position.

26 Claims, 7 Drawing Sheets

U.S. PATENT DOCUMENTS

| | | |
|---|---|---|
| 6,188,465 B1 | 2/2001 | Rees et al. |
| 6,347,163 B1 | 2/2002 | Roustaei |
| 6,385,352 B1 | 5/2002 | Roustaei |
| 6,399,937 B1 | 6/2002 | Huang et al. |
| 6,438,271 B1 | 8/2002 | Usami et al. |
| 6,495,812 B1* | 12/2002 | Wurm et al. .............. 250/201.1 |
| 6,512,602 B1* | 1/2003 | Sheng et al. ................ 358/498 |
| 6,603,580 B1* | 8/2003 | Taillie ........................ 358/474 |
| 2002/0030858 A1* | 3/2002 | Nagata ....................... 358/474 |
| 2003/0025947 A1* | 2/2003 | Spears et al. ............... 358/474 |
| 2003/0112478 A1* | 6/2003 | Chang ........................ 358/498 |
| 2003/0214687 A1* | 11/2003 | Tomaru ...................... 358/513 |
| 2004/0100668 A1* | 5/2004 | Yoshida ...................... 358/494 |
| 2004/0165225 A1* | 8/2004 | Harris et al. ................ 358/474 |
| 2004/0169894 A1* | 9/2004 | Schroath et al. ............ 358/474 |
| 2005/0036176 A1* | 2/2005 | Harris ........................ 358/474 |

FOREIGN PATENT DOCUMENTS

| | | | |
|---|---|---|---|
| EP | 0946040 | | 9/1999 |
| EP | 1003323 | | 5/2000 |
| GB | 2155270 | * | 9/1985 |
| GB | 2390255 A | | 12/2003 |
| JP | 63222573 | | 9/1988 |
| JP | 63-222573 | * | 9/1998 |
| JP | 11-341219 | * | 12/1999 |
| JP | 11341219 | | 12/1999 |

* cited by examiner

END-OF-TRAVEL FOCUS SHIFT IN AN OPTICAL IMAGE SCANNER

BACKGROUND

Optical image scanners, also known as document scanners, convert a visible image (e.g., on a document or photograph, an image in a transparent medium, etc.) into an electronic form suitable for copying, storing, or processing by a computer. An optical image scanner may be a separate device, or an image scanner may be a part of a copier, part of a facsimile machine, or part of a multipurpose device. Reflective image scanners typically have a controlled source of light, and light is reflected off the surface of a document, through an optics system, and onto an array of photosensitive devices (e.g., a charge-coupled device, complimentary metal-oxide semiconductor (CMOS), etc.). Transparency image scanners pass light through a transparent image, for example a photographic positive slide, through optics, and then onto an array of photosensitive devices. The optics focus at least one line, called a scanline, of the image being scanned, onto the array of photosensitive devices. The photosensitive devices convert received light intensity into an electronic signal. An analog-to-digital converter converts the electronic signal into computer readable binary numbers, with each binary number representing an intensity value.

There are two common types of optical image scanners. In a first type, a single spherical reduction lens system is commonly used to focus the scanline onto the photosensor array, and the length of the photosensor array is much less than the length of the scanline. In a second type, an array of many lenses is used to focus the scanline onto the photosensor array, and the length of the photosensor array is the same length as the scanline. For the second type, it is common to use Selfoc® lens arrays (SLA) (available from Nippon Sheet Glass Co.), in which an array of rod-shaped lenses is used, typically with multiple photosensors receiving light through each individual lens.

Depth of focus refers to the maximum distance that the object position may be changed while maintaining a certain image resolution (i.e., the amount by which an object plane may be shifted along the optical path with respect to some reference plane and introduce no more than a specified acceptable blur). The depth of focus for lens arrays is typically relatively short in comparison to scanners using a single spherical reduction lens system. Typically, flat documents are forced by a cover against a transparent platen for scanning, so depth of focus is not a problem. However, there are some situations in which the surface being scanned cannot be placed directly onto a platen. One example is scanning 35 mm slides. A typical frame for a 35 mm slide holds the surface of the film about 0.7–1.5 mm above the surface of the platen. As a result, slides may be slightly out of focus when using lens arrays that are focused at the surface of the platen. Another example is scanning books or magazines where part of a page being scanned curves into a binding spline, causing part of the surface being scanned to be positioned above the transparent platen. A large depth of focus is needed to sharply image the binding spline.

SUMMARY

Embodiments of the present invention provide end-of-travel focus shift in an optical image scanner.

One embodiment is a method for optically scanning comprising translating an optical head to a first end-of-travel position and adjusting the distance between the optical head and a platen by engaging the optical head with a first stop member disposed at the first end-of-travel position.

Another embodiment is an optical image scanner comprising a platen, a ramp member positioned below a lower surface of the platen at a first end-of-travel position, and an optical head having an arm positioned to engage the ramp member as the optical head is translated to the first end-of-travel position and thereby adjust the distance between the optical head and the platen.

Briefly described, another embodiment of an optical image scanner comprises a platen, an optical head, and an end-of-travel means for adjusting the distance between the platen and the optical head at an end-of-travel position.

BRIEF DESCRIPTION OF THE DRAWINGS

Many aspects of the invention can be better understood with reference to the following drawings. The components in the drawings are not necessarily to scale, emphasis instead being placed upon clearly illustrating the principles of the present invention. Moreover, in the drawings, like reference numerals designate corresponding parts throughout the several views.

DETAILED DESCRIPTION

Figure 1:
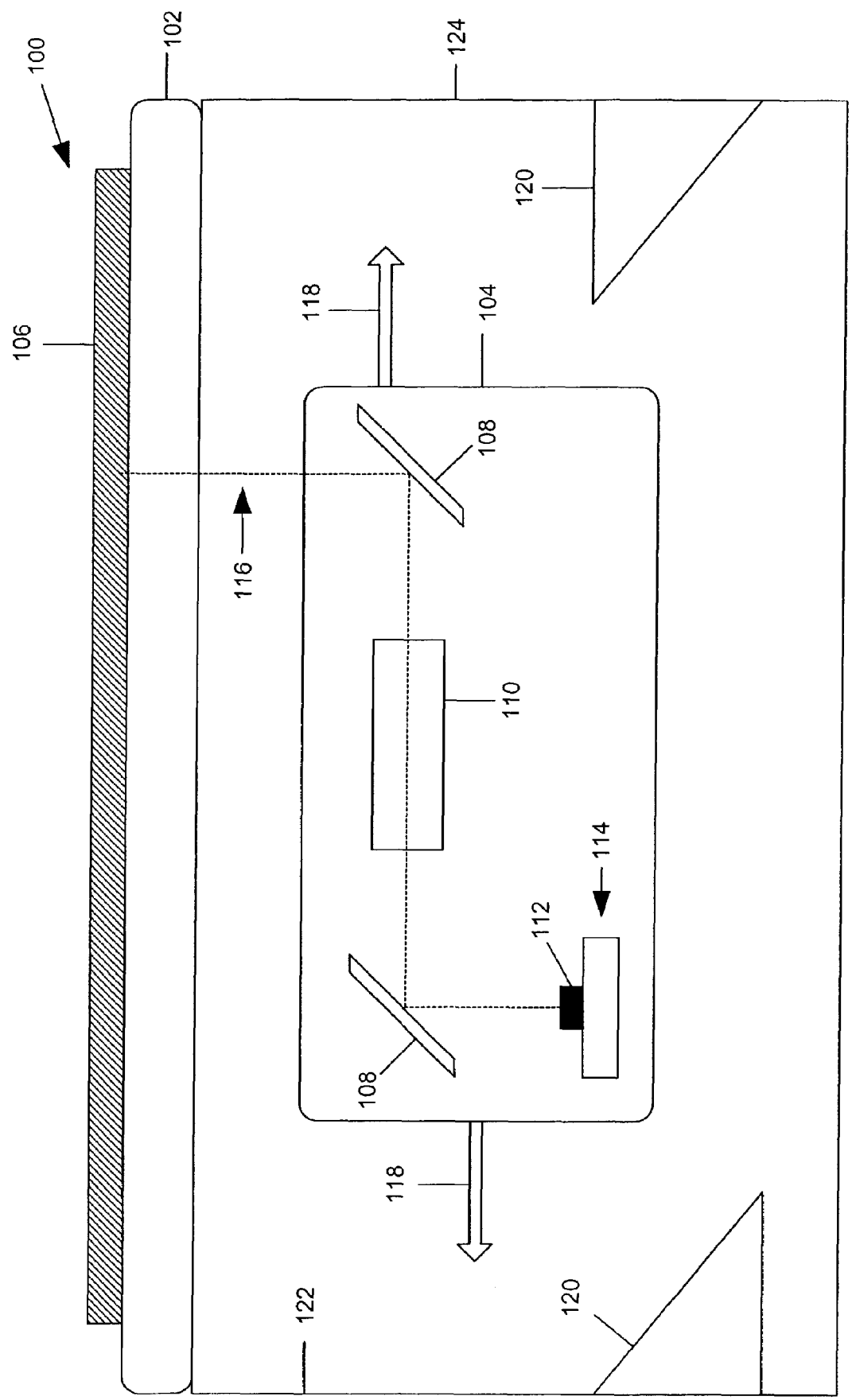
FIG. 1 is a cross-sectional view of an embodiment of an optical image scanner according to the present invention for providing end-of-travel focus shift.

FIG. 1 is a cross-sectional view of an embodiment of an optical image scanner 100, according to the present invention, configured to provide end-of-travel focus shift. The relative sizes of various objects in FIG. 1 are exaggerated to facilitate illustration. As shown in FIG. 1, optical image scanner 100 comprises an optical head 104 (also known as a carriage) positioned relative to a transparent platen 102. As known in the art, a document 106 may be placed on the top surface of the platen 102 for scanning. Optical image scanner 100 may be included within an optical image scanner (e.g., a low profile flatbed scanner), a facsimile machine, copier, etc.

As further illustrated in FIG. 1, optical head 104 comprises a first reflective surface 108 (e.g., mirror, etc.), a lens array 110, a second reflective surface 108, and an image sensor module 114. Image sensor module 114 may comprise, for example, a printed circuit assembly or any other semiconductor device. Image sensor module 114 also includes a photosensor array 112, which may be any type of device configured to receive optical signals and convert the light intensity into an electronic signal. For example, as known in the art, photosensor array 112 may comprise a charge-coupled device (CCD), complimentary metal-oxide semiconductor (CMOS), etc.

Lens array 110 may comprise an array of rod-shaped lenses which have a relatively short depth of focus. For example, lens array 110 may comprise a Selfoc® lens array (SLA), which is manufactured and sold by Nippon Sheet Glass Co. of Somerset, N.J. A rod-lens array may comprise at least one row of graded-index micro lenses, which may be equal in dimensions and optical properties. The lenses may be aligned between two fiberglass-reinforced plastic (FRP) plates. Because FRP has a coefficient of thermal expansion equal to glass, thermal distortion and stress effects are minimal. The FRP also increases mechanical strength of the SLA. The interstices may be filled with black silicone to prevent flare (crosstalk) between the lenses and protect each individual lens.

Figure 2:
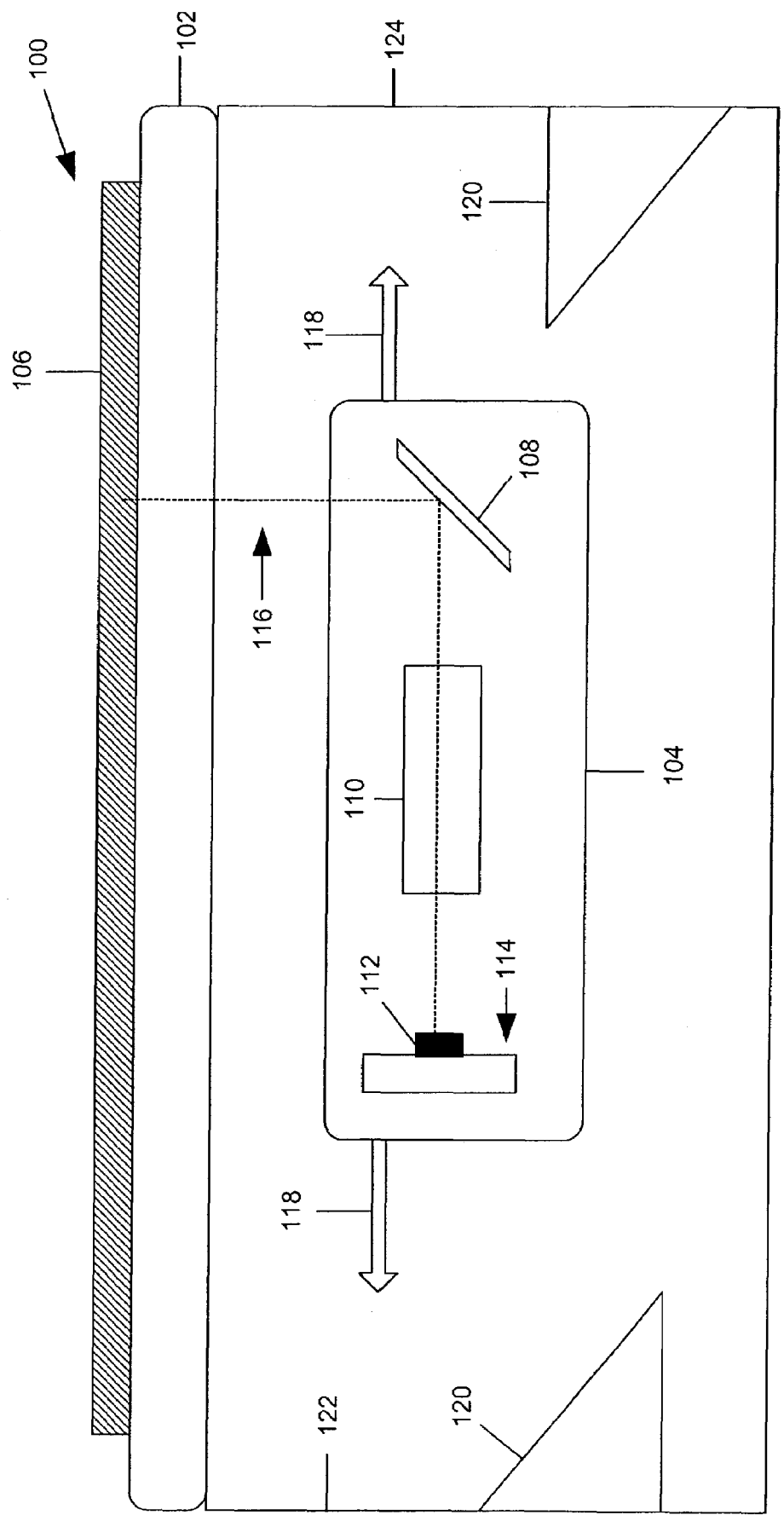
FIG. 2 is a cross-sectional view of another embodiment of an optical image scanner according to the present invention for providing end-of-travel focus.

Referring again to FIG. 1, as a document 106 is being scanned by optical head 104, an optical signal 116 is reflected off the document 106 and towards the first reflective surface 108. The first reflective surface 108 directs the optical signal 116 through the lens array 110 to be focused. The optical signal 116 may also be reflected toward image sensor module 114 by a second reflective surface 108. The optical signal 116 is received by photosensor array 112 and converted into an electronic signal, which may be processed by an analog-to-digital converter, digital signal processor, etc. In this manner, the optics within optical head 104 focus a portion of an image of document 106 onto photosensor array 112. As illustrated in FIG. 2, the second reflective surface 108 may be optional. For instance, in order to alter the cross-sectional profile of optical head 104, second reflective surface 108 may be removed and the image sensor module 114 may be oriented perpendicular to the optical axis of lens array 110 to receive optical signal 116. Alternatively, the optical axis of lens array 110 may be oriented perpendicular to platen 102 to direct light through lens array and onto photosensor array 112. The particular orientation of lens array 110 is not relevant to the present invention.

The optical components within optical head 104 focus at least one line (i.e., a scanline) of the image being scanned onto photosensor array 112. As known in the art, scanning of the entire image may be accomplished by translating optical head 104 relative to document 106 (e.g., by using cables) as indicated by reference number 118.

As mentioned above, due to the relatively small depth of focus of lens array 110, existing optical image scanners may produce blurred images of documents 106 that are positioned a small distance above the primary focal point of lens array 110. For example, existing optical image scanners may be configured with the primary focal point at a relatively short distance $H_0$ above the top surface of platen 102. When a document 106, such as a sheet of paper, etc. is positioned on platen 102, it may be located approximately the distance $H_0$ above the top surface of platen 102 or within the relatively small range of the depth of focus. However, if the document 106 is positioned at an object plane that is outside of a range of acceptable focus, existing optical image scanners may produce a blurred image. For instance, various types of documents (or portions of the document) may be located at an object plane outside of the range of acceptable focus when positioned on platen 102 (e.g., 35 mm slides, transparencies, photographs, books, magazines, etc.).

In this regard, various embodiments of optical image scanner 100 according to the present invention enable multiple object planes to be scanned. Optical image scanner 100 provides a means for shifting the primary focal point of lens array 110 relative to the top surface of platen 102. In this manner, optical image scanner 100 may generate focused images of various types of documents 106 positioned at multiple object planes.

Various exemplary systems and methods according to the present invention for shifting the primary focal point of lens array 110 will be described below. However, as an introductory matter, it should be appreciated that optical image scanner 100 shifts the primary focal point of lens array 110 by adjusting the distance between optical bead 104 and platen 102 based on the translation of the optical head 104 (reference number 118). In other words, as optical head 104 is translated, the motion of optical head 104 (parallel to the platen 102) may be used to generate orthogonal motion to increase/decrease the distance between optical head 104 and platen 102 and thereby adjust the primary focal point of lens array 110 at another object plane above platen 102. In this manner, the primary focal point of lens array 110 may be adjusted using the same mechanism (e.g., cables, motor, etc.) that is used to translate optical head 104. For example, as optical head 104 is translated, it may be lowered relative to platen 102 (i.e., increase the distance between optical head 104 and platen 102), thereby shifting the primary focal point of lens array 110 to another object plane closer to the top surface of platen 102. Furthermore, optical head 104 may be raised relative to platen 102 (i.e., decrease the distance between optical head 104 and platen 102), thereby shifting the primary focal point of lens array 110 to an object plane that is a greater distance from the top surface of platen 102.

Referring again to FIGS. 1 and 2, as a document 106 is being scanned, optical image scanner 100 may be translated along the direction(s) identified by reference number 118—between an end-of-travel position located near a front wall 122 of optical image scanner 100 and an end-of-travel position located near a rear wall 124. Optical image scanner 100 may be translated between any two opposing walls. In accordance with the present invention, the distance between optical head 104 and platen 102 may be adjusted by translating optical head 104 to an end-of-travel position. In this regard, embodiments of optical image scanner 100 may further comprise an end-of-travel mechanism configured to convert the translation motion (parallel to platen 102) into orthogonal motion to adjust the distance between optical head 104 and platen 102.

In the embodiments illustrated in FIGS. 1 and 2, optical image scanner 100 may further comprise a ramp member 120 located at an end-of-travel position (e.g., near front wall 122 and/or rear wall 124). In order to adjust the primary focal point of lens array 110, optical head 104 is translated to the end-of-travel position. One of ordinary skill in the art will appreciate that, as optical head 104 is translated to the end-of-travel position, optical head 104 may engage ramp member 120 and be guided along the slope of ramp member 120. As optical head 104 is guided along the slope of ramp member 120, the distance between optical head 104 and platen 102 is increased/decreased in proportion to the slope of ramp member 120.

Furthermore, it should be appreciated that a pair of ramp members 120 may be used—a first ramp member 120 located at the end-of-travel position near front wall 122 and another ramp member 120 located at the end-of-travel position near rear wall 124. The slope of one ramp member 120 may be positioned to face platen 102 such that, as optical head 104 is translated to the end-of-travel position (e.g., located near front wall 122), optical head 104 is raised relative to platen 102 (i.e., the primary focal point of lens array 110 is shifted to a greater distance above platen 102). The slope of the other ramp member 120 may be positioned away from platen 102 such that, as optical head 104 is translated to the end-of-travel position (e.g., located near rear wall 124), optical bead 104 is lowered relative to platen 102 (i.e., the primary focal point of lens array 110 is shifted closer to the top surface of platen 102).

One of ordinary skill in the art will appreciate that optical image scanner 100 may be configured with a single stop member 120 at one end-of-travel position. In this regard, the primary focal point of lens array 110 may be "toggled" at a single end-of-travel position. For example, the first time optical head 104 is translated to the stop member 120, the optical head 104 may be raised; the second time optical head 104 may be lowered. Furthermore, the amount optical 104 is raised/lowered may be dependent on the amount of distance optical head 104 is translated at the end-of-travel position.

It should be appreciated that a variety of end-of-travel mechanisms may be employed to convert the translation motion (parallel to platen 102) into orthogonal motion to raise/lower optical head 102. For example, the end-of-travel mechanism may comprise any of a number of mechanisms located at the respective end-of-travel positions (e.g., ramp members 120, rotating members, "stop members," etc.). Alternatively, the end-of-travel mechanism may include a first mechanism located at the end-of-travel position and a corresponding mechanism located on optical head 104 to engage the first mechanism. In further embodiments, the end-of-travel mechanism may be integrated with optical head 104 so that a separate mechanism is not required at the end-of-travel position (other than, perhaps, a "stop member"). For instance, optical head 104 may include a ramp member that causes optical head 104 to move in an orthogonal direction relative to the platen 102, when optical head 104 is translated into the stop member. Thus, the mechanism for converting the translation motion (parallel to platen 102) into orthogonal motion may be contained within optical head 104. Furthermore, in this embodiment, the design of optical image scanner 100 may be simplified (i.e., no special shapes, actuators, levers, bars, wedges, etc. are required at the end-of-travel position(s)).

Figure 3:
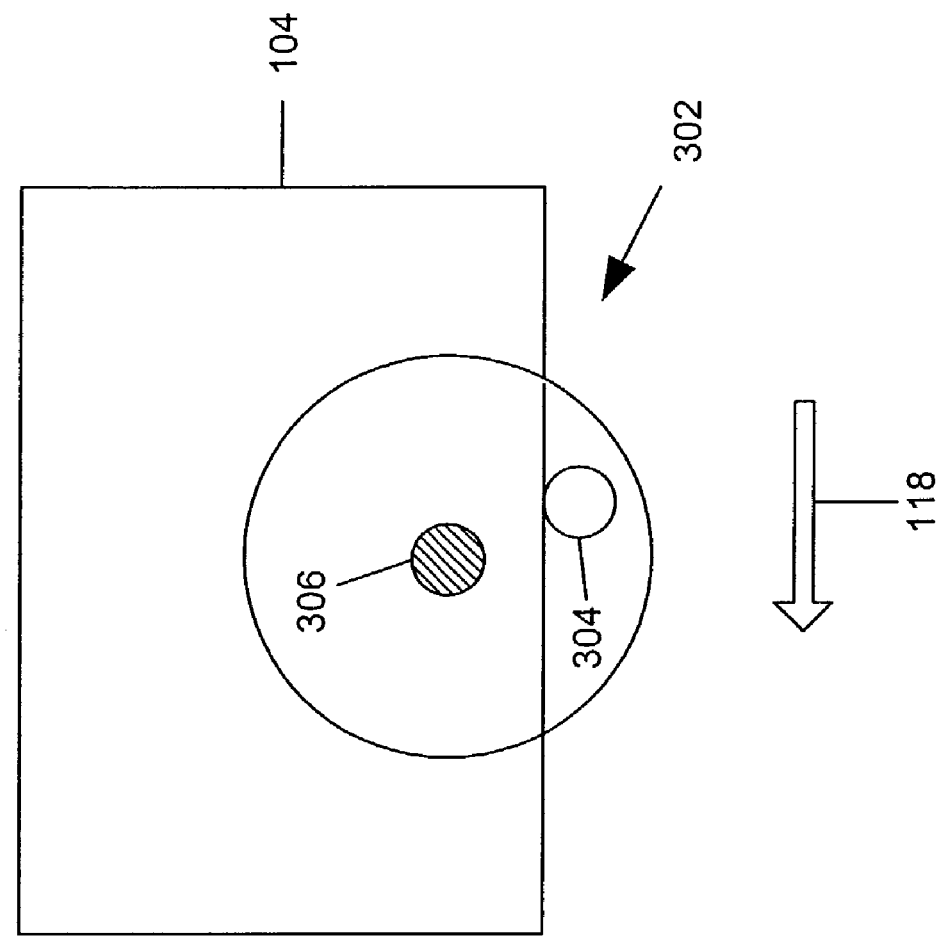
FIG. 3 is a cross-sectional view of an optical head such as shown in FIGS. 1 and 2 being translated to the end-of-travel position at the front of the optical image scanner.
Figure 3:
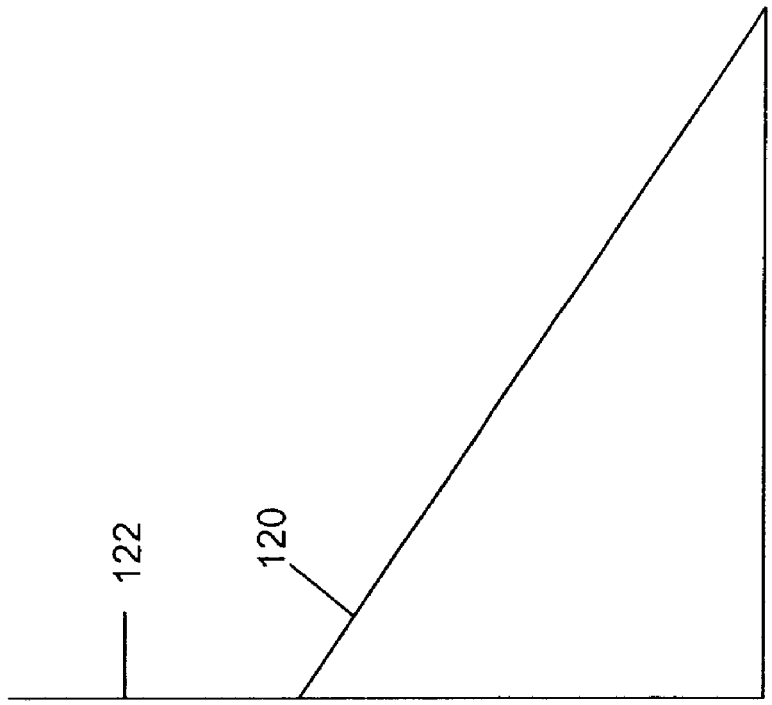

Referring to FIGS. 3–7, an exemplary end-of-travel mechanism will be described. As illustrated in FIG. 3, an end-of-travel mechanism 302 may be attached to, disposed within, or otherwise included with optical head 104. End-of-travel mechanism 302 may comprise an arm extending from optical head 104 (e.g., floating shaft 304) and a mounting shaft 306 attached by a linkage. Although any linkage may be used to connect floating shaft 304 and mounting shaft 306, the linkage illustrated in FIG. 3 comprises a wheel. Floating shaft 304 may be connected to optical head 104 (e.g., to a housing that covers the optical components). Mounting shaft 306 may be connected to the mechanism that translates optical head 104. For example, mounting shaft 306 may be connected to rail(s) used to translate optical head 104.

Figure 4B:
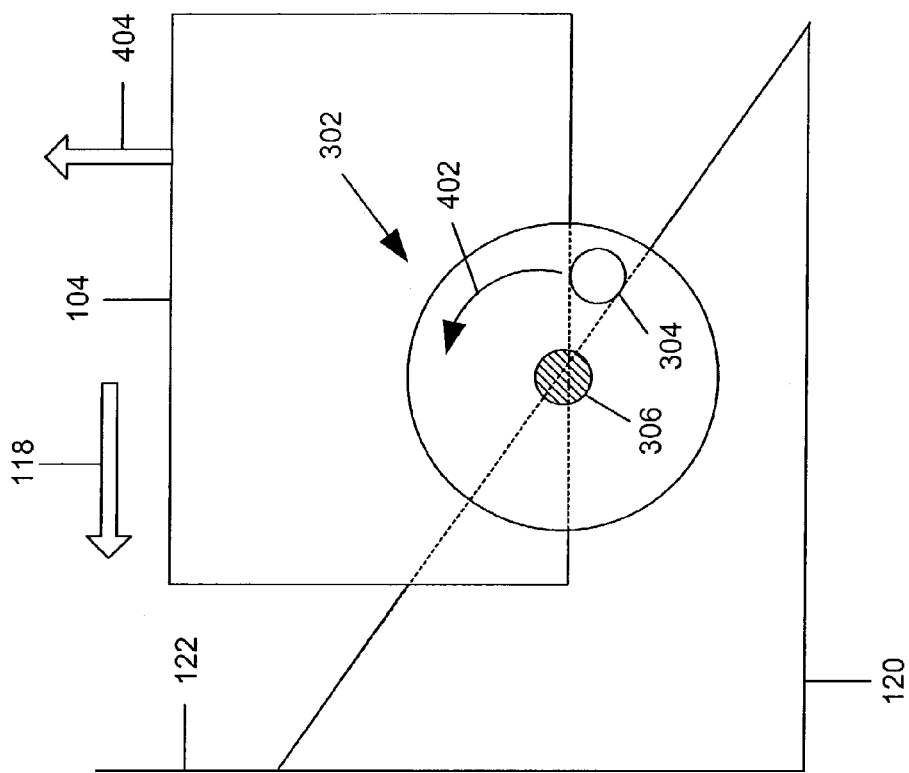
FIG. 4b is an alternative view of FIG. 4a illustrating the optical head being adjusted to a position closer to the platen as the optical head engages the end-of-travel mechanism.
Figure 4A:
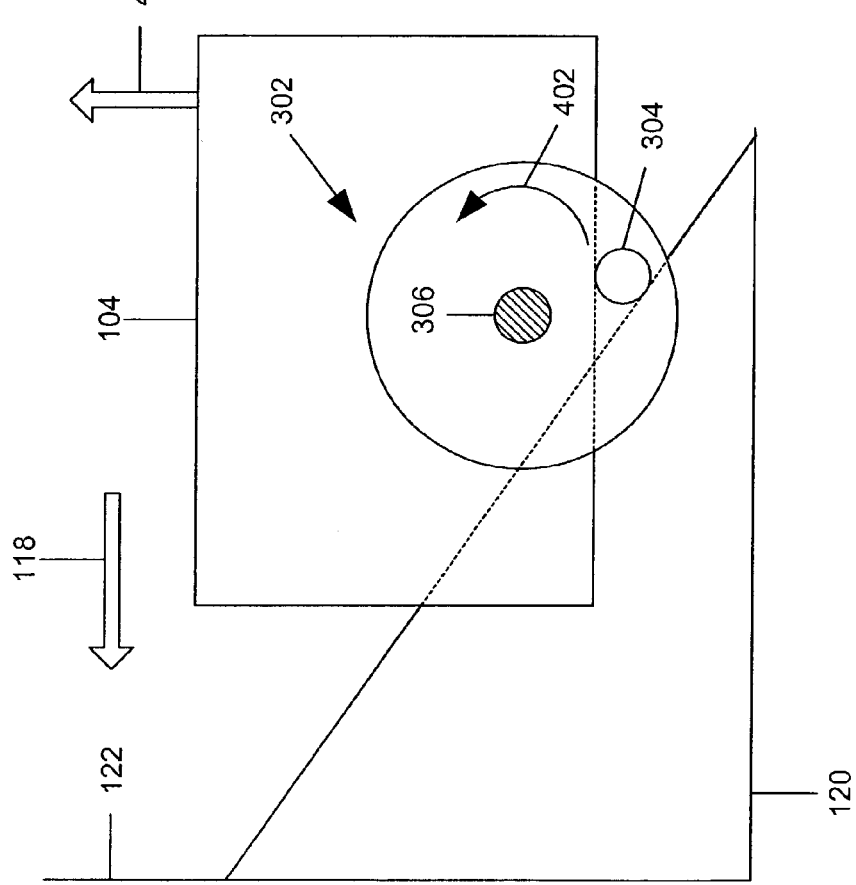
FIG. 4a is a cross-sectional view of an optical head such as shown in FIGS. 1–2 engaging an end-of-travel mechanism at the front of the optical image scanner.

FIGS. 4a and 4b illustrate optical head 104 being translated to the end-of-travel position located near front wall 122 of optical image scanner 100. As illustrated in FIG. 4a, when optical head 104 reaches the end-of-travel position, floating shaft 304 engages ramp member 120. Then, as optical head 104 continues to move parallel to platen 102, floating shaft 304 rotates counterclockwise relative to mounting shaft 306 (reference number 402) to the position illustrated in FIG. 4b. The rotation of floating shaft 304 causes optical head 104 to be raised to a position closer to platen 102 as indicated by reference number 404. It should be noted that, as optical head 104 is raised (due to the rotation of floating shaft 304), optical head 104 may also be guided along the slope of ramp member 120. The distance between optical head 104 and platen 102 may be further decreased by continuing to translate and guide optical head 104 up ramp member 120. In this manner, optical image scanner 100 adjusts the primary focal point of lens array 110 to another object plane located above platen 102. Thus, optical image scanner 100 may then scan the new object plane to generate a more focused image of document 106.

Figure 5:
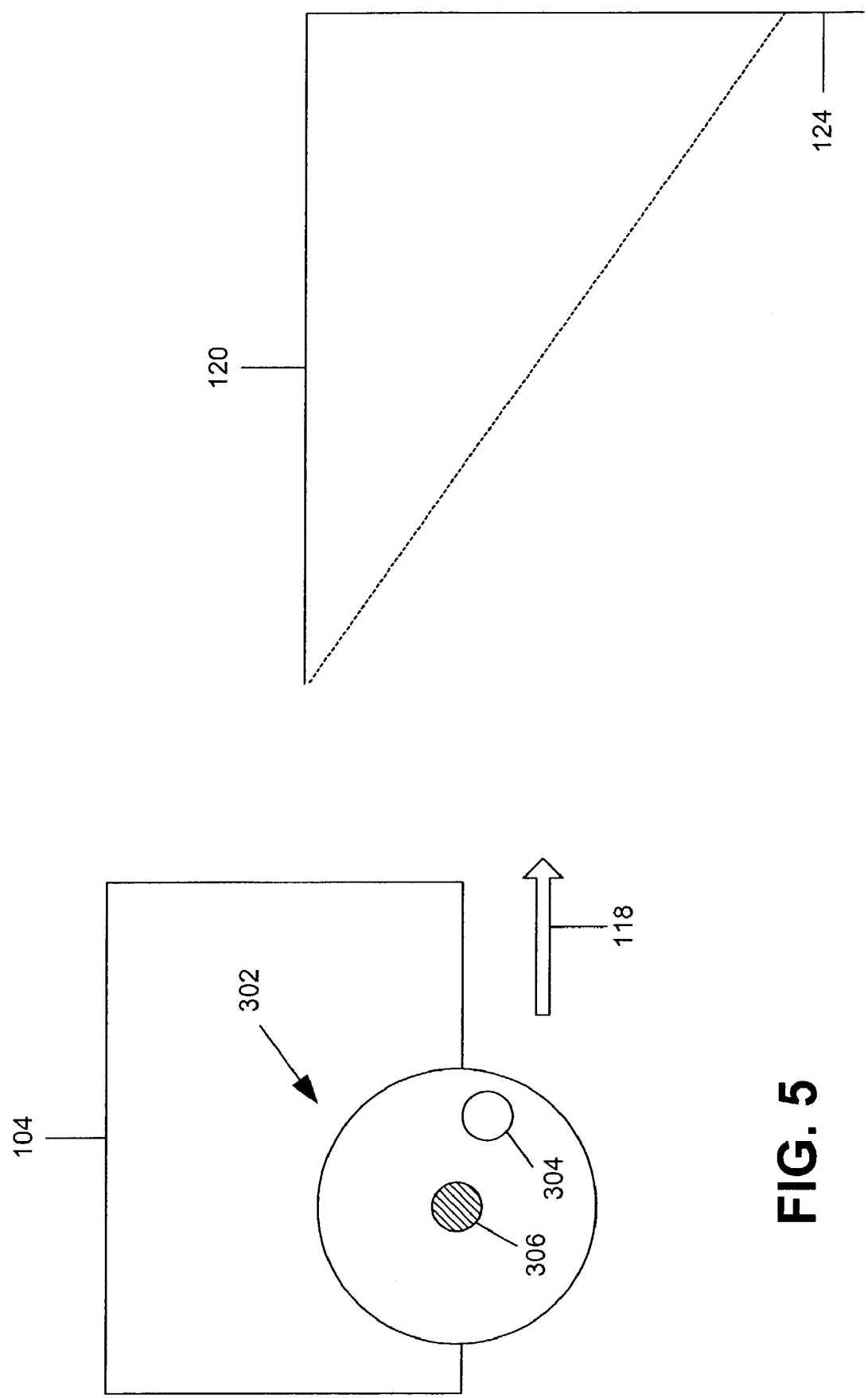
FIG. 5 is a cross-sectional view of an optical head such as shown in FIGS. 1 and 2 being translated to the end-of-travel position at the rear of the optical image scanner.
Figure 6B:
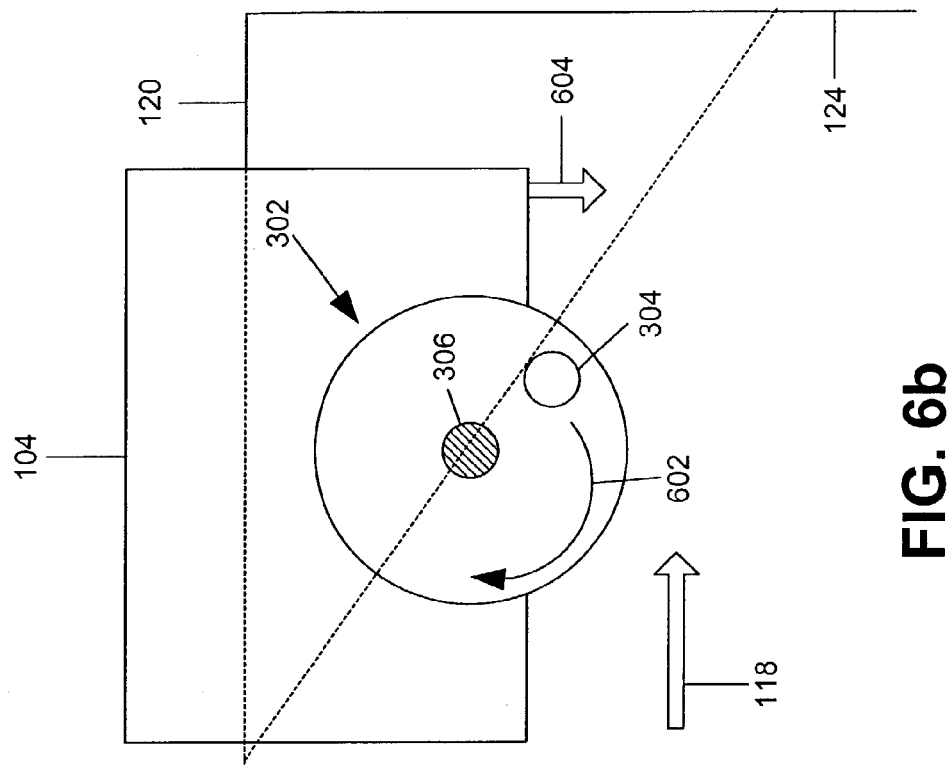
FIG. 6b is an alternative view of FIG. 6a illustrating the optical head being adjusted to a position farther away from the platen as the optical head engages the end-of-travel mechanism.
Figure 6A:
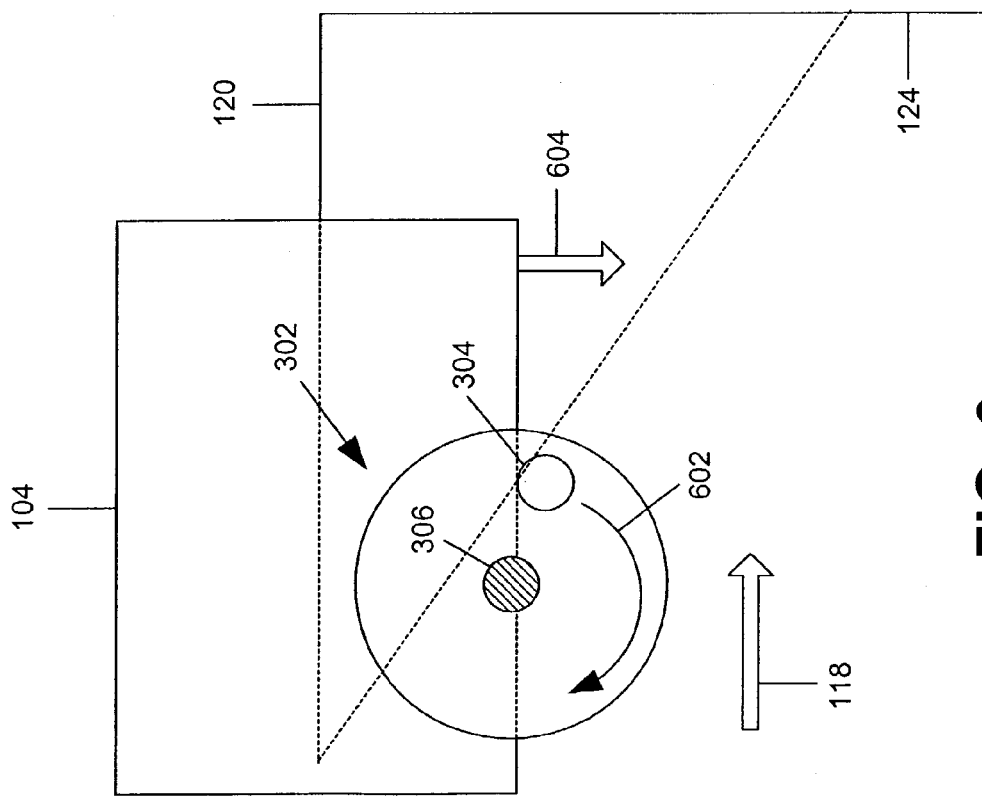
FIG. 6a is a cross-sectional view of an optical head such as shown in FIGS. 1–2 engaging an end-of-travel mechanism at the rear of the optical image scanner.

Optical image scanner 100 may also be configured to adjust the primary focal point of lens array 110 to a position closer to platen 102. FIGS. 5, 6a and 6b illustrate optical head 104 being translated to the end-of-travel position located near rear wall 124 of optical image scanner 100. As illustrated in FIG. 6a, when optical head 104 reaches the end-of-travel position, floating shaft 304 engages ramp member 120. Then, as optical head 104 continues to move parallel to platen 102, floating shaft 304 may rotate clockwise relative to mounting shaft 306 (reference number 602) to the position illustrated in FIG. 6b. The rotation of floating shaft 304 causes optical head 104 to be lowered to a position farther away from platen 102 as indicated by reference number 604. It should be noted that, as optical head 104 is lowered (due to the rotation of floating shaft 304), optical head 104 may also be guided along the slope of ramp member 120. The distance between optical head 104 and platen 102 may be further increased by continuing to translate and guide optical head 104 down ramp member 120. In this manner, optical image scanner 100 may adjust the primary focal point of lens array 110 to another object plane located above platen 102. Thus, optical image scanner 100 may then scan the new object plane to generate a more focused image of document 106.

Figure 7:
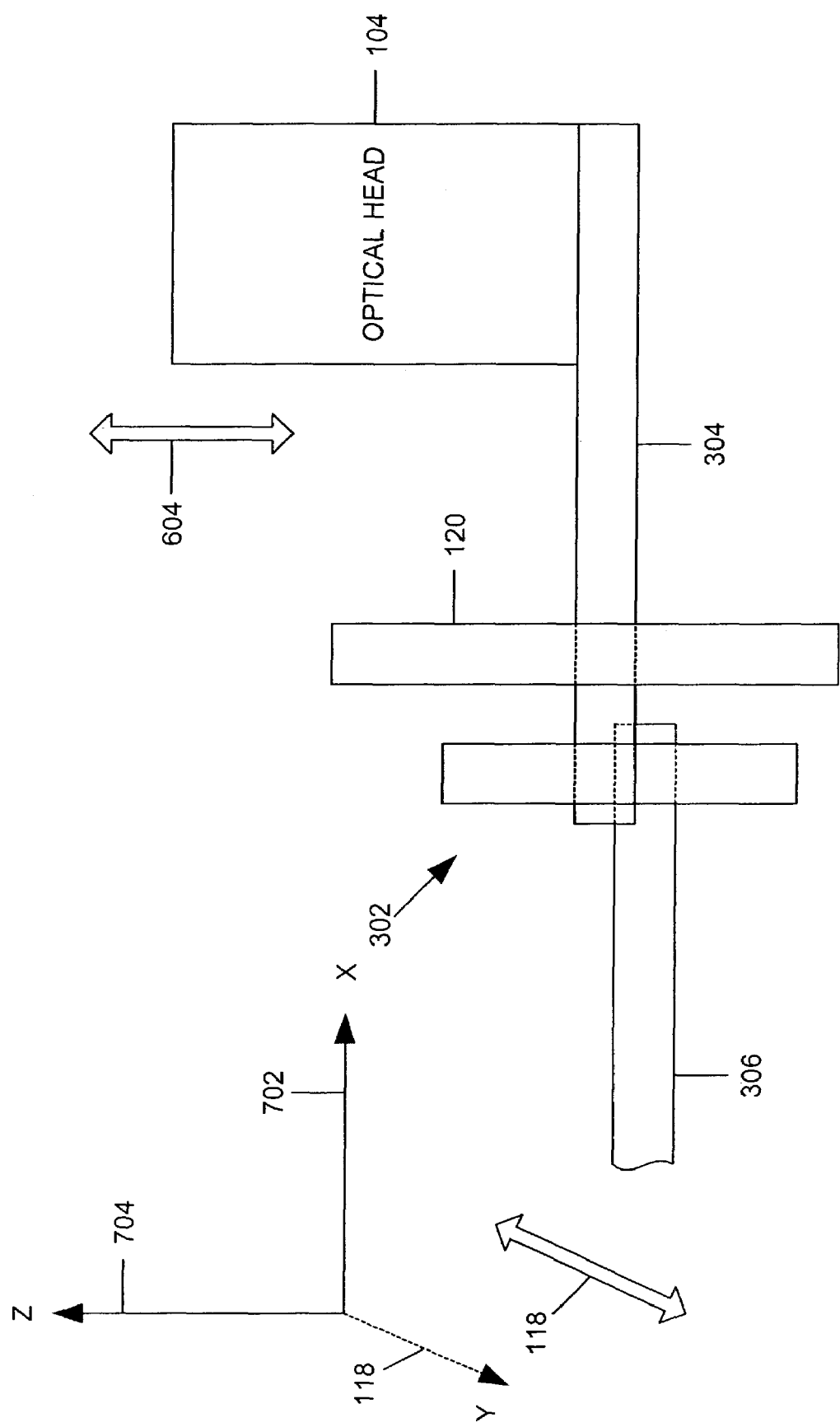
FIG. 7 is a simplified view illustrating an operation of the end-of-travel mechanism.

The operation of end-of-travel mechanism 302 is illustrated in more detail in FIG. 7. As illustrated in FIG. 7, floating shaft 304 and mounting shaft 306 may be disposed along one axis (the x-axis represented by reference number 702). Optical head 104 may be translated between end-of-travel positions along another axis (the y-axis represented by reference number 118). For instance, as mounting shaft 306 is translated along the y-axis, floating shaft 304 and optical head 104 are also translated. As described above, when optical head 104 is translated to an end-of-travel position, floating shaft 304 engages ramp member 120. Then, as optical head 104 continues to move parallel to platen 102 along the y-axis, floating shaft 304 may be rotated relative to mounting shaft 306. The rotation of floating shaft 304 causes optical head 104 to be raised/lowered (depending on the end-of-travel position) along another axis (the z-axis represented by reference number 704).

The invention claim is:

1. A method of optically scanning comprising:
   translating an optical bead to a first end-of-travel position; and
   adjusting the distance between the optical head and a platen by engaging an arm of the optical head with a first stop member disposed at the first end-of-travel position.

2. The method of claim 1, wherein the adjusting the distance between the optical head and a platen comprises adjusting the distance between the optical head and a platen by engaging the optical head with a first ramp member disposed at the first end-of-travel position.

3. The method of claim 2, wherein the adjusting the distance between the optical head and a platen comprises guiding the optical head down the first ramp member to increase the distance between the optical bead and the platen.

4. The method of claim 2, wherein the adjusting the distance between the optical head and a platen comprises guiding the optical head up the first ramp member to decrease the distance between the optical head and the platen.

5. The method of claim 1, further comprising:
translating the optical head to a second end-of-travel position; and
adjusting the distance between the optical head and the platen by engaging the optical head with a second stop member disposed at the second end-of-travel position.

6. The method of claim 1, wherein the adjusting the distance between the optical head and a platen by engaging the optical bead with a first stop member comprises engaging a first shaft attached to the optical bead with the ramp member to rotate the first shaft relative to a second shaft.

7. The method of claim 1, wherein the adjusting the distance between the optical head and a platen by engaging the optical head with a first stop member comprises guiding a shaft attached to the optical head along the slope of the ramp.

8. An optical scanner comprising:
a platen to position a document to be scanned;
a ramp member positioned below a lower surface of the platen at a first end-of-travel position; and
an optical head having an arm positioned to engage the ramp member as the optical head is translated to the first end-of-travel position and thereby adjust the distance between the optical head and the platen.

9. The optical scanner of claim 8, wherein the slope of the ramp member faces the platen such that, as the optical head is translated to the first end-of-travel position, the arm is guided up the slope of the ramp member and thereby decreases the distance between the optical head and the platen.

10. The optical scanner of claim 9, further comprising a second ramp member positioned below the lower surface of the platen at a second end-of-travel, the slope of the second ramp member facing away from the platen such that, as the optical head is translated to the second end-of-travel position, the arm is guided down the slope of the second ramp member and thereby increase the distance between the optical head and the platen.

11. The optical scanner of claim 8, wherein the arm comprises a shaft configured to be guided along the slope of the ramp member.

12. The optical scanner of claim 8, wherein the arm comprises:
a mounting shaft for translating the optical head;
a floating shaft attached to the optical head and positioned to engage the ramp member as the optical head is translated to the first end-of-travel position; and
a linkage connecting the first shaft and the second shaft.

13. The optical scanner of claim 12, wherein the floating shaft is rotated relative to the mounting shaft as the optical head engages the ramp member and thereby adjusts the distance between the optical head and the platen.

14. The optical scanner of claim 12, wherein the slope of the ramp member faces the platen such that, as the optical head is translated to the first end-of-travel position, the floating shaft is guided along the slope of the ramp member and thereby decreases the distance between the optical head and the platen.

15. The optical scanner of claim 14, further comprising a second ramp member positioned below the lower surface of the platen at a second end-of-travel position, the slope of the second ramp member facing away from the platen such that, as the optical head is translated to the second end-of-travel position, the floating shaft is guided along the slope of the second ramp member and thereby increases the distance between the optical head and the platen.

16. The optical scanner of claim 8, wherein the optical head further comprises a rod lens array and an image sensor module.

17. An optical scanner comprising:
a platen means to position a document to be scanned;
an optical head means; and
an end-of-travel means for adjusting the distance between the platen means and the optical head means at an end-of-travel position in response to engagement of an arm means of the optical head means with the end-of-travel means at the end-of-travel position.

18. The optical scanner of claim 17, wherein the end-of-travel means comprises a ramp means for guiding the optical head means along the slope of the ramp means.

19. The optical scanner of claim 18, wherein the end-of-travel means further comprises:
a first shaft means attached to the optical head means;
a second shaft means for translating the optical head means; and
a means for linking the first and second shaft means.

20. An optical scanner comprising:
a platen to position a document to be scanned;
an optical head having an arm; and
a ramp member for engaging the arm to adjust the distance between the platen and the optical head at an end-of-travel position.

21. The optical scanner of claim 20, wherein the ramp member is adapted to guide the optical head along a slope thereof for adjusting the distance.

22. An optical scanner comprising:
means for supporting a document to be scanned;
means for generating a scanned image of the document; and
means disposed at an end-of-travel position for adjusting the distance between the supporting means and the generating means in response to engagement of an arm means of the generating means with the adjusting means.

23. The optical scanner of claim 22, wherein the means for adjusting comprises a means for guiding the generating means along a slope thereof for adjusting the distance.

24. An optical scanner comprising:
a platen means to position a document to be scanned;
an optical head means having an arm means; and
means disposed at an end-of-travel position of the optical head means for adjusting a distance between the platen means and the optical head means in response to the arm means engaging the means disposed at the end-of-travel position.

25. The optical scanner of claim 24, wherein the means for adjusting comprises a ramp means.

26. The optical scanner of claim 24, wherein the means for adjusting is adapted to guide the optical bead means along a slope thereof for adjusting the distance.

* * * * *

UNITED STATES PATENT AND TRADEMARK OFFICE
CERTIFICATE OF CORRECTION

PATENT NO. : 7,055,743 B2
APPLICATION NO. : 10/370671
DATED : June 6, 2006
INVENTOR(S) : Kevin J. Youngers It is certified that error appears in the above-identified patent and that said Letters Patent is hereby corrected as shown below:

On page 2, in field (56), under "Foreign Patent Documents", in column 2, line 4, below "GB   2390255 A    12/2003" delete "JP     63222573    9/1988".

On page 2, in field (56), under "Foreign Patent Documents", in column 2, line 7, below "JP   11-341219 *   12/1999" delete "JP     11341219    12/1999".

In column 4, line 17, delete "bead" and insert -- head --, therefor.

In column 5, line 12, delete "bead" and insert -- head --, therefor.

In column 6, line 57, in Claim 1, delete "bead" and insert -- head --, therefor.

In column 7, line 4, in Claim 3, delete "bead" and insert -- head --, therefor.

In column 7, line 19, in Claim 6, delete "bead" and insert -- head --, therefor.

In column 7, line 20, in Claim 6, delete "bead" and insert -- head --, therefor.

In column 8, line 64, in Claim 26, delete "bead" and insert -- head --, therefor.

Signed and Sealed this

Twelfth Day of May, 2009

JOHN DOLL
*Acting Director of the United States Patent and Trademark Office*